US012674916B2

(12) United States Patent
Zalkovskij et al.

(10) Patent No.: US 12,674,916 B2
(45) Date of Patent: Jul. 7, 2026

(54) PROTECTIVE STRUCTURES FOR MANUFACTURE OF METASURFACES

(71) Applicant: NILT Switzerland GmbH, Horgen (CH)

(72) Inventors: Maksim Zalkovskij, Copenhagen (DK); Jesper Fly Hansen, Copenhagen (DK); Tobias Senn, Zurich (CH); Brian Bilenberg, Ølstykke (DK)

(73) Assignee: NILT Switzerland GmbH, Horgen (CH)

( * ) Notice: Subject to any disclaimer, the term of this patent is extended or adjusted under 35 U.S.C. 154(b) by 403 days.

(21) Appl. No.: 18/026,903

(22) PCT Filed: Sep. 17, 2021

(86) PCT No.: PCT/EP2021/075690
§ 371 (c)(1),
(2) Date: Mar. 17, 2023

(87) PCT Pub. No.: WO2022/063705
PCT Pub. Date: Mar. 31, 2022

(65) Prior Publication Data
US 2023/0333288 A1 Oct. 19, 2023

Related U.S. Application Data

(60) Provisional application No. 63/081,644, filed on Sep. 22, 2020.

(51) Int. Cl.
*G02B 1/14* (2015.01)
*G02B 1/00* (2006.01)

(52) U.S. Cl.
CPC ............... *G02B 1/14* (2015.01); *G02B 1/002* (2013.01)

(58) Field of Classification Search
CPC ................................... G02B 1/002; G02B 1/14
See application file for complete search history.

(56) References Cited

U.S. PATENT DOCUMENTS

| | | | |
|---|---|---|---|
| 2003/0201241 A1 | 10/2003 | Harker et al. | |
| 2008/0024866 A1 | 1/2008 | Walter et al. | |
| 2011/0250407 A1 | 10/2011 | Kustandi et al. | |
| 2016/0170160 A1 | 6/2016 | Akabane et al. | |
| 2017/0010488 A1* | 1/2017 | Klug ...................... | G02B 6/004 |

(Continued)

FOREIGN PATENT DOCUMENTS

| | | |
|---|---|---|
| CN | 108291983 A | 7/2018 |
| CN | 111679351 A | 9/2020 |

(Continued)

OTHER PUBLICATIONS

International Preliminary Report on Patentability in International Appln. No. PCT/EP2021/075690, dated Apr. 6, 2023, 13 pages.

(Continued)

*Primary Examiner* — James A Dudek
(74) *Attorney, Agent, or Firm* — Fish & Richardson P.C.

(57) ABSTRACT

The present disclosure describes techniques that, in some instances, can help reduce stress and potential damage during the manufacture of optical elements such as those that include a metastructure formed by imprinting. In one aspect, a method of manufacturing an optical element includes imprinting a stamp into a polymeric material on a substrate, wherein the stamp includes first projections corresponding to an active area of the stamp for formation of meta-atoms in the polymeric material. The stamp further includes a protective structure laterally surrounding the first projections. The protective structure includes at least one additional projection extending in parallel to the first projections. The method includes removing the stamp from the polymeric material, thereby forming openings in the polymeric material in positions corresponding to the first pro- (Continued)

112E jections and in one or more positions corresponding to the at least one additional projection.

29 Claims, 7 Drawing Sheets

(56)                References Cited

U.S. PATENT DOCUMENTS

| | | |
|---|---|---|
| 2017/0082263 A1 | 3/2017 | Byrnes et al. |
| 2019/0064532 A1 | 2/2019 | Riley, Jr. et al. |
| 2020/0264343 A1 | 8/2020 | Han et al. |

FOREIGN PATENT DOCUMENTS

| | | |
|---|---|---|
| JP | 2015-227999 A | 12/2015 |
| KR | 20090061771 A | 6/2009 |
| WO | WO 2021/233831 A1 | 11/2021 |
| WO | WO 2021/255077 A1 | 12/2021 |

OTHER PUBLICATIONS

International Search Report and Written Opinion in International Appln. No. PCT/EP2021/075690, dated Mar. 14, 2022, 18 pages.

Invitation to Pay Additional Fees in International Appln. No. PCT/EP2021/075690, dated Jan. 19, 2022, 10 pages.

Communication under Rule 164(2)(a) EPC in European Appln. No. 21773847.5, mailed on Mar. 12, 2025, 7 pages.

Communication pursuant to Rule 164(2)(b) and Article 94(3) EPC in European Appln. No. 21773847.5, mailed on Jun. 3, 2025, 14 pages.

Office Action in Chinese Appln. No. 202180063796.3, mailed on Jul. 30, 2025, 21 pages (with English translation).

* cited by examiner

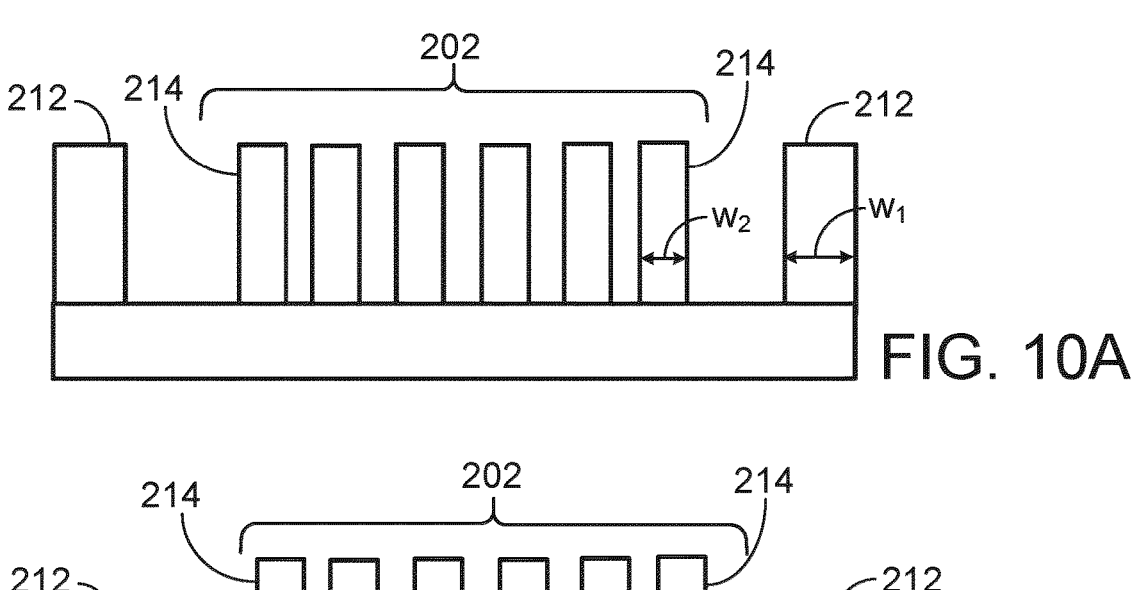
FIG. 10A
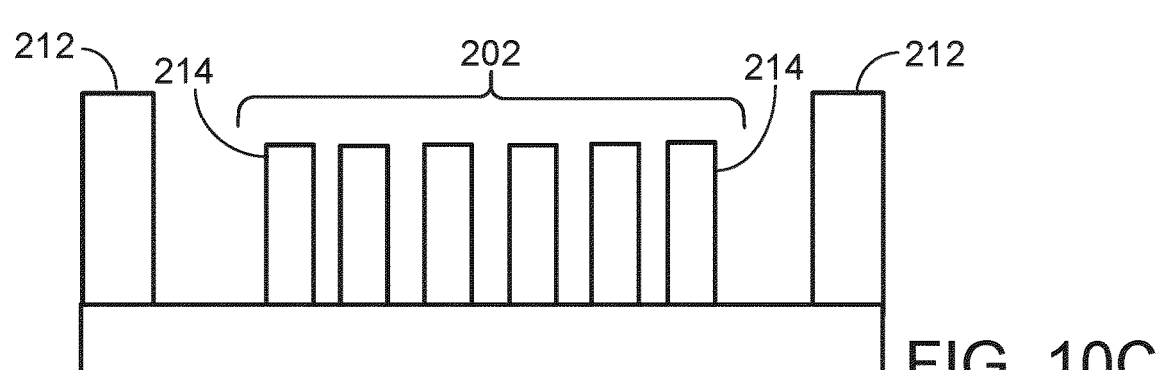
FIG. 10B
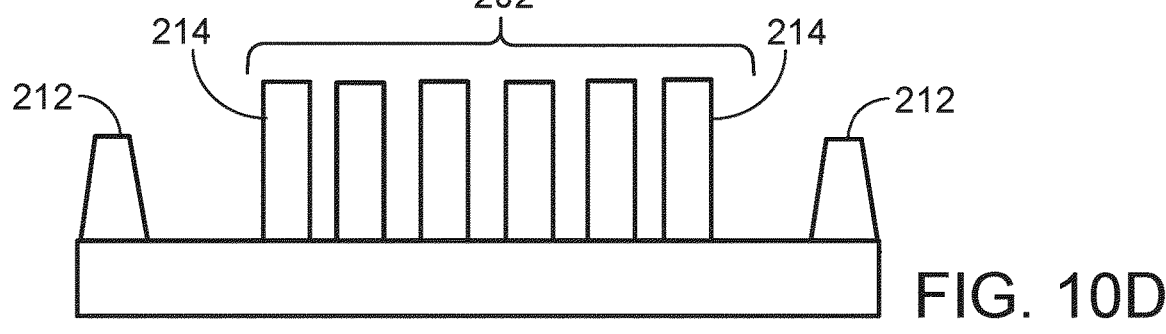
FIG. 10C
FIG. 10D

PROTECTIVE STRUCTURES FOR MANUFACTURE OF METASURFACES

CROSS-REFERENCE TO RELATED APPLICATIONS

This application is a National Stage application under 35 U.S.C. § 371 of International Application No. PCT/EP2021/075690, filed on Sep. 17, 2021, which claims priority and benefit from U.S. Provisional Patent Application No. 63/081,644, filed on Sep. 22, 2020, the contents and disclosures of which are incorporated herein by reference in their entireties.

FIELD OF THE DISCLOSURE

The present disclosure relates to the manufacture of metasurfaces.

BACKGROUND

Advanced optical elements may include a metasurface, which refers to a surface with distributed small structures (e.g., meta-atoms) arranged to interact with light in a particular manner. For example, a metasurface, which also may be referred to as a metastructure, can be a surface with a distributed array of nanostructures. The nanostructures may, individually or collectively, interact with light waves. For example, the nanostructures or other meta-atoms may change a local amplitude, a local phase, or both, of an incoming light wave.

When meta-atoms (e.g., nanostructures) of a metasurface are in a particular arrangement, the metasurface may act as an optical element such as a lens, lens array, beam splitter, diffuser, polarizer, bandpass filter, or other optical element. In some instances, metasurfaces may perform optical functions that are traditionally performed by refractive and/or diffractive optical elements. The meta-atoms may be arranged, in some cases, in a pattern so that the metastructure functions, for example, as a lens, grating coupler or other optical element. In other instances, the meta-atoms need not be arranged in a pattern, and the metastructure can function, for example, as a fanout grating, diffuser or other optical element. In some implementations, the metasurfaces may perform other functions, including polarization control, negative refractive index transmission, beam deflection, vortex generation, polarization conversion, optical filtering, and plasmonic optical functions.

A metastructure can be transferred, for example, to an ultraviolet (UV)-curable resin by imprinting techniques, such as nanoimprint lithography (NIL), which can facilitate the large scale manufacture of optical elements having metastructures. Imprinting with a relatively rigid stamp, however, may damage the underlying thin glass substrate on which the metastructures are formed. Although more flexible stamps may be used for the imprinting, the active area of a flexible stamp may tend to wear off as the stamp is used repeatedly.

SUMMARY

The present disclosure describes techniques that, in some instances, can help reduce stress and potential damage during the manufacture of optical elements such as those that include a metastructure formed by imprinting.

For example, one aspect describes a method of manufacturing an optical element. The method includes imprinting a stamp into a polymeric material on a substrate, wherein the stamp includes first projections corresponding to an active area of the stamp for formation of meta-atoms in the polymeric material. The stamp further includes a protective structure laterally surrounding the first projections. The protective structure includes at least one additional projection extending in parallel to the first projections. The method includes removing the stamp from the polymeric material, thereby forming openings in the polymeric material in positions corresponding to the first projections and in one or more positions corresponding to the at least one additional projection.

Some implementations include one or more of the following features. For example, the method can include depositing a material in the openings in the polymeric material to form the meta-atoms of the optical element in the positions corresponding to the first projections and to form a protective structure laterally surrounding the meta-atoms.

In some instance, the protective structure of the stamp includes a plurality of projections. The protective structure of the stamp can include, for example, multiple groups of projections, wherein adjacent projections within each particular one of the groups are separated from another by a first distance, and wherein adjacent groups are separated from one another by a second distance that differs from the first distance. In some cases, the second distance is greater than the first distance.

In some implementations, the protective structure of the stamp includes a first group of projections having a diameter and a second group of projections having a second diameter greater than the first diameter.

In some implementations, the protective structure of the stamp includes projections arranged in a circular pattern that alternates between a respective one of the projections in the first group and a respective one of the projections in the second group.

The present disclosure also describes an apparatus that includes an optical element including a metasurface including meta-atoms, and a protective structure outside of an optically active area of the metasurface. The protective structure laterally surrounds the optically active area and is composed of the same material as the meta-atoms.

Some implementations include one or more of the following features. For example, in some implementations, the protective structure completely encircles the optically active area laterally. Thus, the protective structure may be a continuous annular structure.

In some implementations, the protective structure includes multiple substructures. For example, in some instances, the substructures are separated from one another and, collectively, laterally surround the optically active area. The substructures can, for example, pillar-shaped, semi-annular shaped or have some other shape.

In some implementations, the substructures include multiple groups of substructures, wherein adjacent substructures within each particular one of the groups are separated from another by a first distance, and wherein adjacent groups are separated from one another by a second distance that differs from the first distance. In some cases, the second distance is greater than the first distance.

In some implementations, the substructures include a first group of substructures having a diameter and a second group of substructures having a second diameter greater than the first diameter. The substructures can be arranged, for example, in a circular pattern that alternates between a respective one of the substructures in the first group and a respective one of the substructures in the second group.

In some instances, the substructures have a shape that differs from a shape of the meta-atoms. Further, in some instances, the substructures have a height that differs from a height of the meta-atoms.

Some implementations include one or more of the following advantages. For example, in some cases, the quality of the stamp can be improved and its lifetime can be extended. Likewise, in some cases, degradation in the optical performance of the metastructures can be reduced. The techniques may be particularly advantageous, for example, when using a flexible imprint stamp in the under-filling-NIL regime.

Other aspects, features and advantages will be readily apparent from the following detailed description, the accompanying drawings and the claims.

BRIEF DESCRIPTION OF THE DRAWINGS

FIGS. 10A through 10D illustrate further examples of metastructures laterally surrounded by protective structures.

DETAILED DESCRIPTION

The present disclosure describes techniques that, in some instances, can help reduce stress and potential damage during the manufacture of optical elements such as those that include a metastructure formed by imprinting.

Figures 1A, 1B:
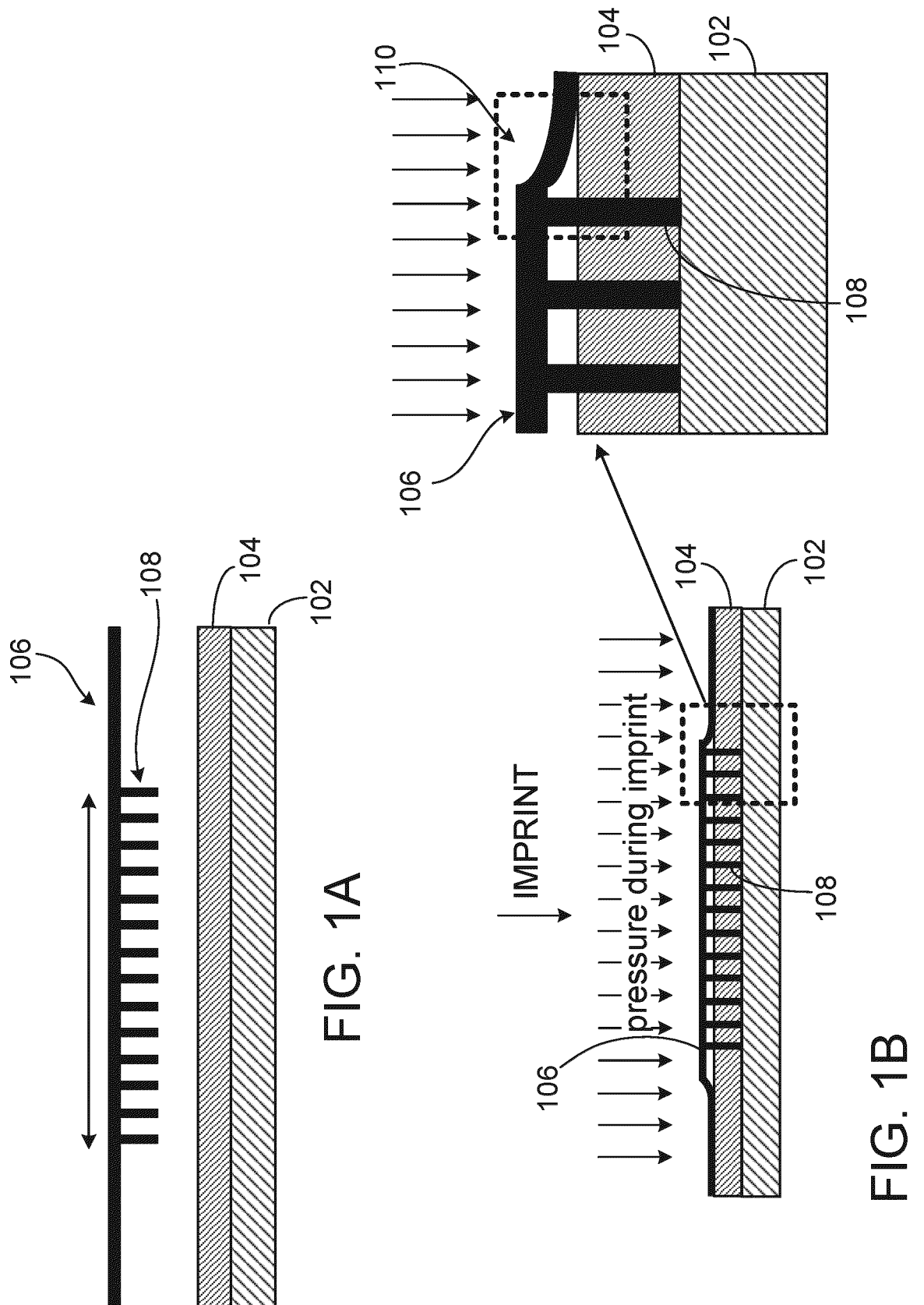
FIGS. 1A-1B illustrate various steps in an imprinting technique for forming an optical metastructure.

FIGS. 1A-1B illustrate various steps in an imprinting technique for forming an optical metastructure. As illustrated in FIG. 1A, a substrate 102 has a polymeric layer 104 deposited on its surface. The substrate may be selected to be optically transmissive with respect to a particular wavelength or range of wavelengths of radiation (e.g., infra-red (IR) or visible light) depending on the application(s) in which the metastructure is to be used. For example, in some instances, the substrate 102 may be composed of glass. Different materials may be suitable for other implementations. Examples of the polymeric layer 104 include a NIL resist. Other polymeric materials may be suitable for some implementations.

An arrangement of openings that correspond to the locations of the meta-atoms is formed in the polymeric layer 104. In some implementations, the openings in the polymeric layer 104 are formed by an imprinting technique. For example, the polymeric layer 104 can be imprinted using a flexible imprint stamp (which also may be referred to as an imprint mask or mold) 106 having an arrangement of features 108 that project toward the substrate 102. The arrangement of features 108 represents an inverse image of the desired arrangement of openings. As illustrated in FIG. 1B, the stamp 106 is brought into contact with the polymeric layer 104 and is pressed towards the substrate 102. The imprinting imparts an inverse image of the features 108 into the polymeric layer 104, thereby creating the arrangement of openings. In some implementations, the imprinting process involves embossing or replication. Prior to separating the stamp 106 from the polymeric layer 104, the polymeric layer 104 can be cured (for example, using an ultraviolet (UV) flash cure and/or a thermal cure).

Subsequently, a metamaterial can be deposited over the polymeric layer 104 so as to fill the openings and form the individual meta-atoms of the metastructure. The metamaterial can be deposited, for example, by atomic layer deposition (ALD). A suitable metamaterial for the meta-atoms is titanium dioxide ($TiO_2$), which has a high refractive index relative to the material that surrounds it. Other materials, such as oxides, nitrides, metals or dielectrics, may be used in some instances. Materials including one or more of zirconium oxide ($ZnO_2$), tin oxide ($SnO_2$), indium oxide ($In_2O_3$), or tin nitride (TiN) can be used as the metamaterial in some implementations. In general, it is desirable that the metamaterial have a relatively high index of refraction and relatively low optical loss. In some instances, excess metamaterial is removed, for example, by etching back the material to expose the meta-atoms embedded in the polymeric layer 104. Suitable techniques for removing the top layer of metamaterial include, for example, plasma etching, chemical etching or chemical-mechanical polishing (CMP).

As shown in FIG. 1B, one problem that may arise in the foregoing processes is that areas 110 subjected to large amounts of stress (i.e., during the imprinting step) can result in damage to the active area of the stamp. Such damage may reduce the useful lifetime of the stamp, and also may degrade the quality of the metastructures.

Figures 2A, 2B:
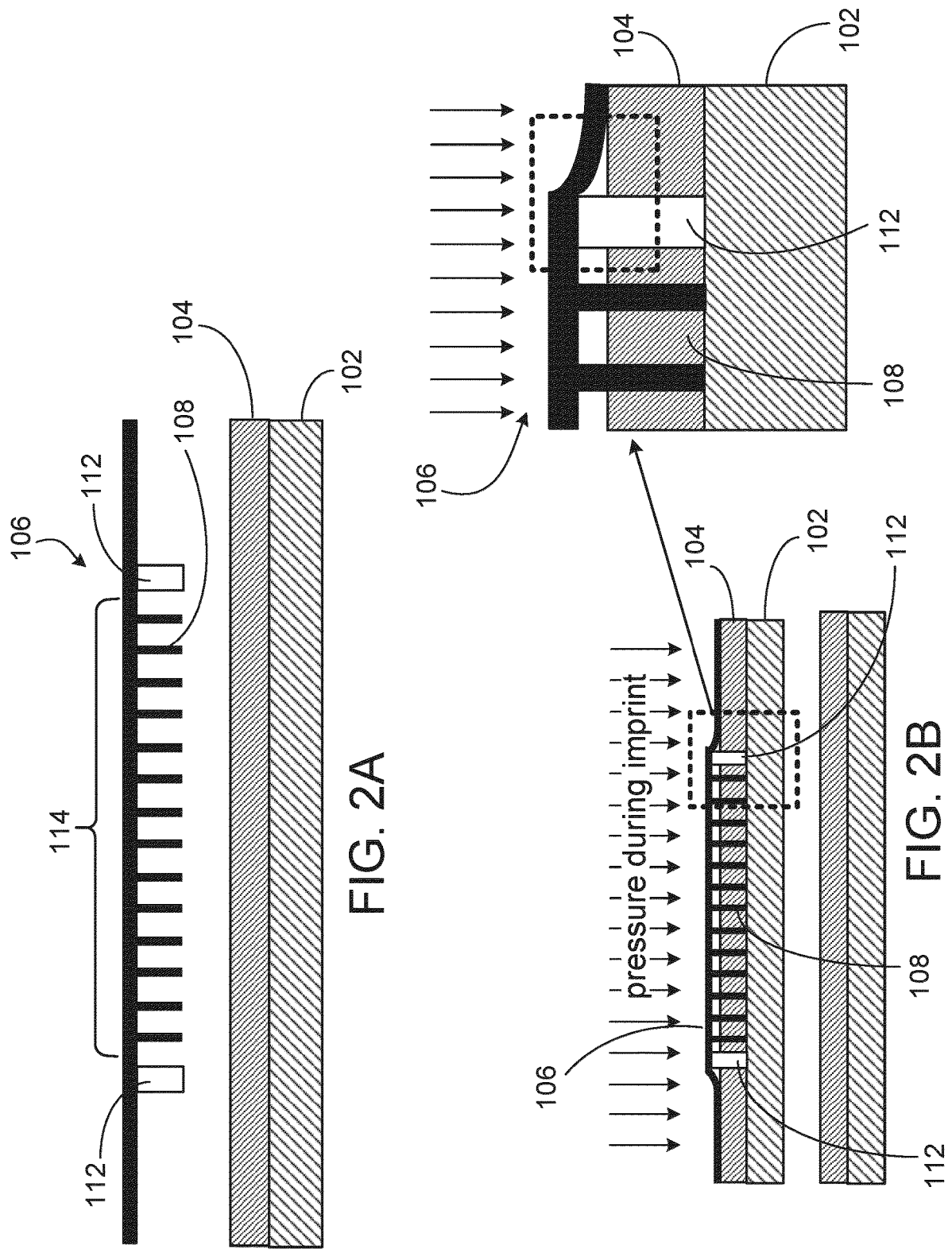
FIGS. 2A-2B illustrate various steps in an imprinting technique, including an imprint stamp having a protective structure, for forming an optical metastructure.
Figure 3:
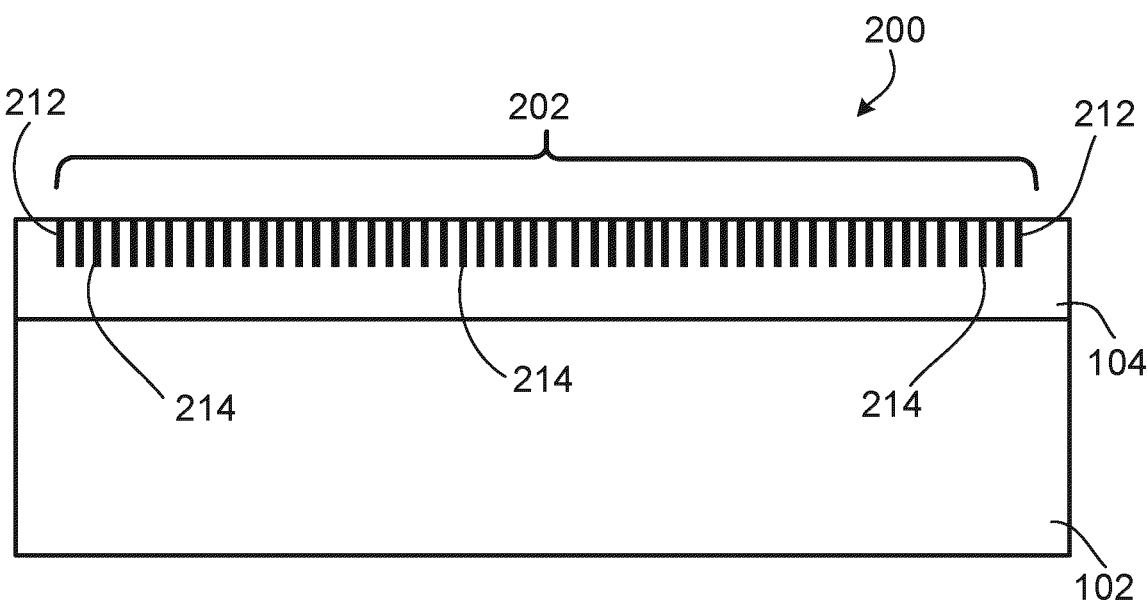
FIG. 3 illustrates an example of an optical element.

To reduce such stresses, a protective structure can be provided as part of the stamp. As shown, for example, in FIG. 2A, the protective structure 112 projects toward the substrate 102 in the same direction as the features 108 defining the active area 114 of the stamp and can laterally encircle the features 108. The protective structure 112, which may be composed of one or more projections from the surface of the stamp 106, is imprinted into the polymeric layer 104 at the same time as the features 108 defining the optically active area of the metastructure (see FIG. 2B). The presence of the protective structure 112 can, in some instances, help reduce stresses that would otherwise occur, for example, near the periphery of the active area 114. Opening(s) in the polymeric layer 104 formed by the protective structure 112 during the imprinting subsequently can be filled with the same metamaterial used to form the individual meta-atoms of the metastructure. Thus, as shown in FIG. 3, the resulting optical element 200 can include a protective structure 212 laterally surrounding the optically active area of the metastructure 202. The protective structure 212 is composed of the same material as the meta-atoms 214 of the metastructure 202 and can be formed simultaneously with the meta-atoms. The protective structure 212 for the metastructure 202 has substantially the same shape as the protective structure 112 of the stamp 106 used during the imprinting process.

Each meta-atom 214 in the optically active area of the metastructure 202 may have the shape, for example, of a post. The meta-atoms 214 may be arranged in a one- or two-dimensional array. In some implementations, the meta-atoms 214 are arranged in other patterns, e.g., in concentric rings. Adjacent meta-atoms 214 are separated from one another by the polymeric material 104. The meta-atom 214 may have dimensions of, for example, tens of nanometers (nm) or hundreds of nm. In some implementations, each meta-atom 214 has a dimension between 10 nm and 100 nm. In some implementations, each meta-atom 214 has a dimension between 100 nm and 500 nm. In some implementations, each meta-atom 214 has a dimension of less than 1 μm. In some implementations, each meta-atom 214 has a dimension of less than 10 μm. In some cases, each meta-atoms has a height that is on the order of ten times greater than its width. In some instances, the meta-atoms have a height in the range of 800 nm±500 nm and have a diameter in the range of 60-400 nm. The dimensions of the meta-atoms may differ for other implementations.

The meta-atoms may be arranged, in some cases, in a pattern so that the metastructure functions, for example, as a lens, grating coupler or other optical element. In other instances, the meta-atoms need not be arranged in a pattern, and the metastructure can function, for example, as a fanout grating, diffuser or other optical element. In some implementations, the metastructure may perform other functions, including polarization control, negative refractive index transmission, beam deflection, vortex generation, polarization conversion, optical filtering, and/or plasmonic optical functions.

The shape and/or size of the protective structure 212 can vary depending on the particular implementation. The following paragraphs describe examples of the protective structure 212 that laterally surrounds the optically active area of the metastructure 202.

Figure 4:
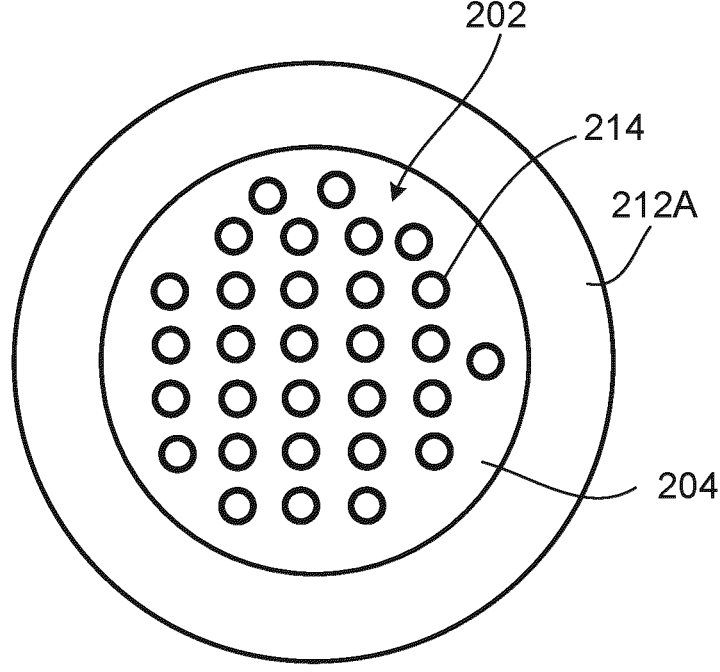
FIG. 4 illustrates a first example of a metastructure laterally surrounded by a protective structure.

In some cases, as shown in the example of FIG. 4, the protective structure 212A is formed as a single continuous annular structure that completely encircles the optically active area 204 of the metastructure 202. In this case, the corresponding protective structure 112 of the imprint stamp 106 likewise would be a single continuous annular structure that laterally surrounds the active area of the stamp. Such a structure can be used, for example, where the volume of the polymeric layer 104 material deposited in the active area can be controlled precisely, such that there is no need for overflow of excess polymeric layer 104 material.

Figures 5A, 5B, 6A, 6B:
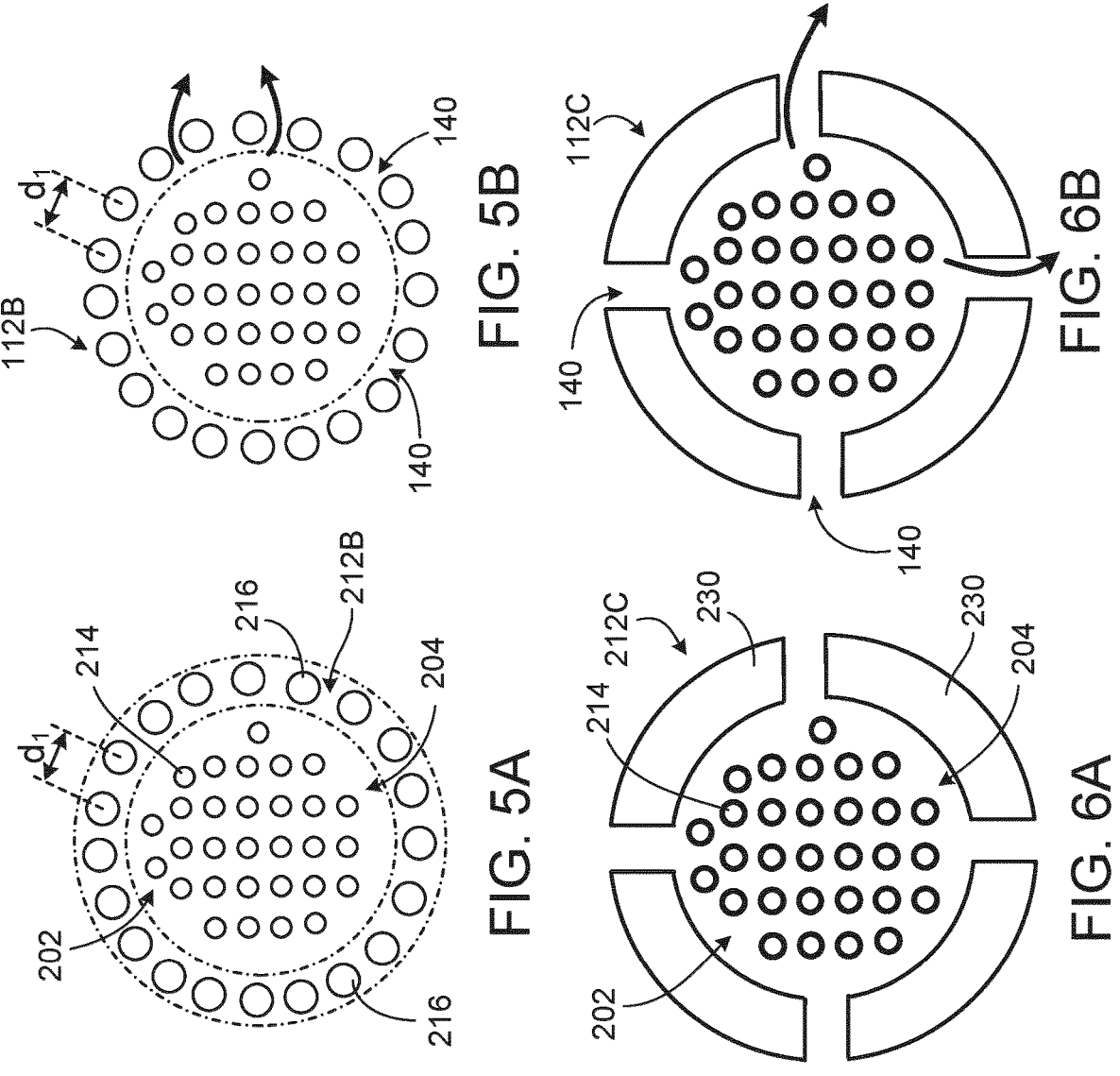
FIG. 5A illustrates a second example of a metastructure laterally surrounded by a protective structure.
FIG. 5B illustrates a corresponding imprint stamp.
FIG. 6A illustrates a third example of a metastructure laterally surrounded by a protective structure.
FIG. 6B illustrates a corresponding imprint stamp.

In some applications, excess polymeric layer 104 material should be able to flow freely away from the active area. In such situations, it is desirable for the protective structure 112 of the imprint stamp 106 to be configured to provide sufficient mechanical protection, as well as to allow for excess polymeric layer 104 material to flow away. FIG. 5A illustrates an example in which the protective structure 212B in the resulting optical element is composed of multiple substructures (e.g., posts) 216 separated from one another and collectively surrounding the active area 204 of the metastructure 202. In this case, the corresponding protective structure 112B of the stamp 106 likewise is composed of multiple substructures (e.g., projections) separated from one another and collectively laterally surrounding the active area of the stamp (see FIG. 5B). Spaces 140 between adjacent ones of the substructures of the protective structure of the stamp 106 can serve as channels to allow for excess polymeric layer 104 material to flow freely away.

The density of the substructures 216 for the protective structure 212B can be substantially the same as the density of the meta-atoms 214 of the metastructure 202. In other cases, the density of the substructures 216 for the protective structure 212B differs from the density of the meta-atoms 214 of the metastructure 202. Thus, in some cases, the density of the substructures 216 is higher (e.g., 20%) and, in some cases, the density of the substructures is lower (e.g., 20%) than the density of the meta-atoms 214.

FIG. 6A illustrates an example in which the protective structure 212C in the resulting optical element is composed of multiple semi-annular substructures 230 that are separated from one another and that collectively laterally surrounding the optically active area 204 of the metastructure 202. In this case, the corresponding protective structure 112C of the stamp 106 likewise is composed of multiple semi-annular substructures separated from one another and collectively surrounding the active area of the stamp laterally (see FIG. 6B). In such an implementation, spaces 140 between adjacent ones of the substructures of the protective structure 112C of the stamp 106 can serve as channels to allow for excess polymeric layer 104 material to flow freely away.

Figures 7A, 7B, 8A, 8B:
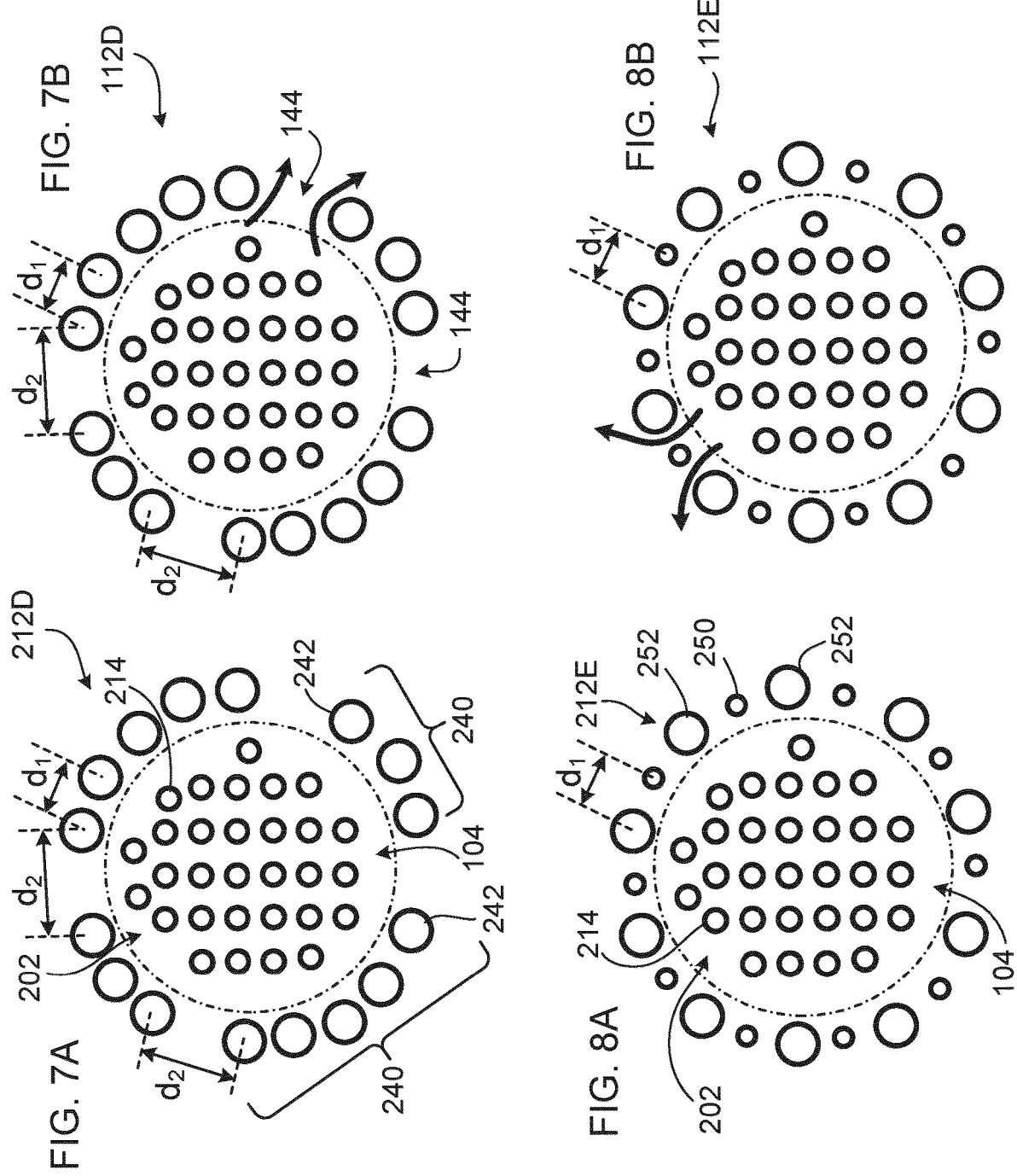
FIG. 7A illustrates a fourth example of a metastructure laterally surrounded by a protective structure.
FIG. 7B illustrates a corresponding imprint stamp.
FIG. 8A illustrates a fifth example of a metastructure laterally surrounded by a protective structure.
FIG. 8B illustrates a corresponding imprint stamp.

As shown in the example of FIG. 7A, in some instances, the protective structure 212D in the resulting optical element is composed of multiple groups 240 of substructures 242 (e.g., posts) separated from one another and collectively surrounding the active area 204 of the metastructure 202 laterally. In the illustrated implementation, the adjacent substructures 242 within a given group 240 are separated from one another by a first distance d1, and adjacent groups 240 are separated from one another by a second distance d2, where d2>d1. Each group 240 can have the same number of substructures 242 as the other groups 240. In some cases, the number of substructures 242 in a particular group 240 may differ from that of at least some of the other groups 240. The corresponding protective structure 112D of the stamp 106 likewise would be composed of corresponding multiple groups of substructures laterally surrounding the active area of the stamp (see FIG. 7B). Here as well, spaces 144 between adjacent ones of the groups of substructures of the protective structure 112D of the stamp 106 can serve as channels to allow for excess polymeric layer 104 material to flow freely away more easily.

In some instances, the substructures that form the protective structure 212E of the resulting optical element have at least two different sizes (e.g., diameters). For example, as shown in FIG. 8A, first substructures (e.g., posts) 250 have a first diameter, whereas second substructures (posts) 252 have a second diameter larger than the first diameter. In the illustrated example, adjacent ones of the second substructures 252 are separated from one another by a respective one of the first substructures 250. Collectively, the first and second substructures 250, 252 surround the active area 204 of the metastructure 202 laterally. In this case, the corresponding protective structure 112E of the stamp 106 likewise is composed of substructures having different sizes and that collectively surround the active area of the stamp laterally (see FIG. 8B). This arrangement can facilitate excess polymeric layer 104 material to flow freely away more easily around the smaller substructures.

Figure 9B:
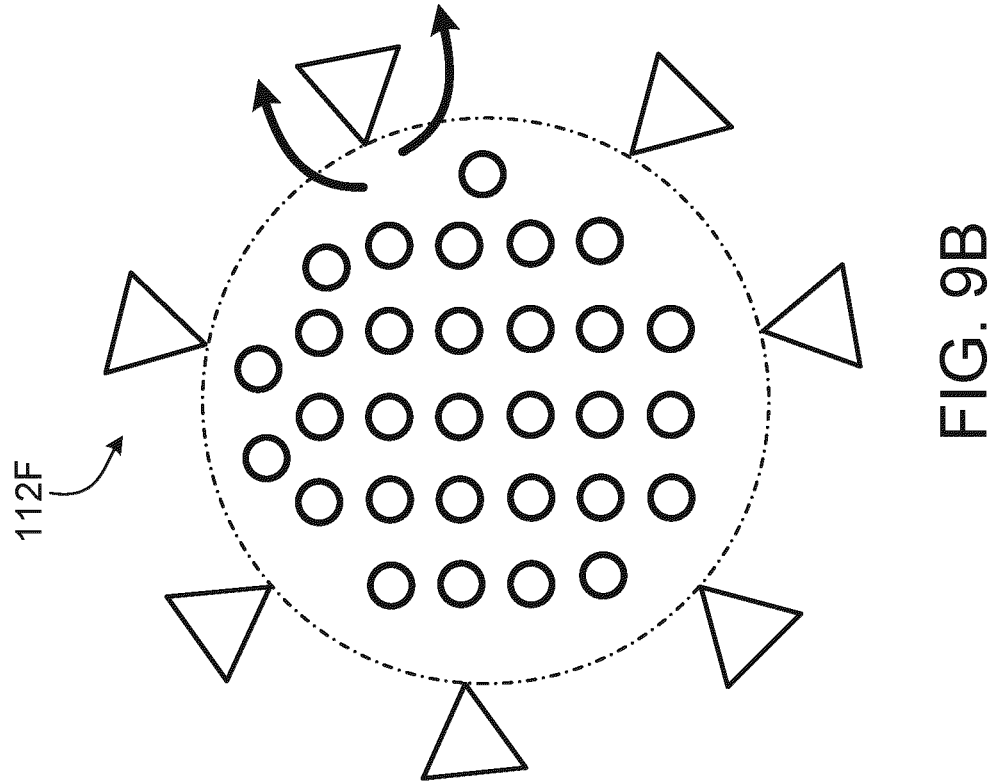
FIG. 9B illustrates a corresponding imprint stamp.
Figure 9A:
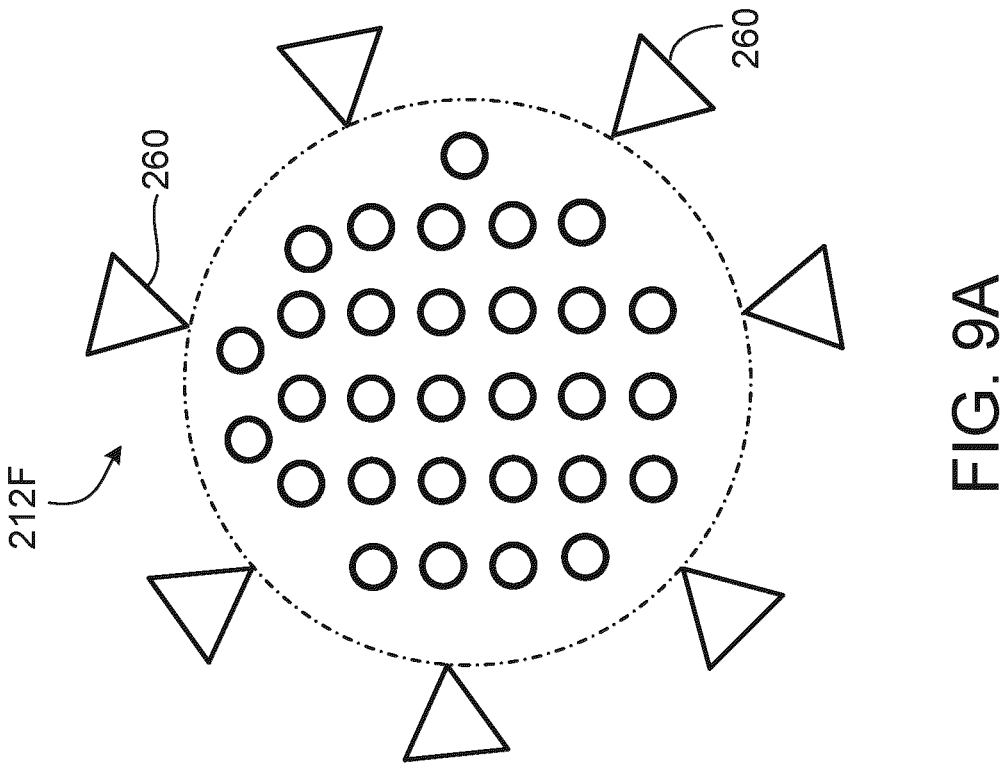
FIG. 9A illustrates a sixth example of a metastructure laterally surrounded by a protective structure.

Although the substructures (e.g., 216 in FIG. 5A; 242 in FIG. 7A; 250 and 252 in FIG. 8A) of the protective structures may have a circular cross-section as illustrated in the examples above, in some implementations the substructures of the protective structure may have other shapes. Thus, FIG. 9A shows an example in which the substructures 260 of the protective structure 212F of the resulting optical element have a triangular cross-section. In this case, the corresponding protective structure 112F of the stamp 106 likewise is composed of substructures having a triangular cross-section (see FIG. 9B). Other cross-sectional shapes for the substructures of the protective structure (in the stamp and the resulting optical element) can be used as well.

In some implementations, the height of the protective structure 212 is substantially the same as the height of the meta-atoms 214 forming the metastructure 202 (see FIG. 10A). However, in other instances, the height of the protective structure 212 can be less than the height of the meta-atoms 214 forming the metastructure (FIG. 10B), and in yet other instances, the height of the protective structure 212 can be greater than the height of the meta-atoms 214 forming the metastructure (FIG. 10C). As illustrated in the foregoing examples of FIGS. 10A-10C, the width W1 of the protective structure can differ (e.g., be greater than) the width W2 of the meta-atoms. Further, in some instances, the shape (cross-sectional side view) of the protective structure 212 can differ from the shape of the meta-atoms. For example, as shown in FIG. 10D, the protective structure 212 has a pyramid shaped cross-section, whereas the meta-atoms 214 have a rectangular shaped cross-section.

Incorporation of a protective structure laterally surrounding the optically active area of a metastructure can be achieved by imprinting techniques as well. For example, in some implementations, meta-atoms and the surrounding protective structure can be formed by etching into a layer (e.g., poly-Si) disposed on a glass or other substrate. In such cases, an imprint stamp can be pressed, for example, into a UV NIL resist layer disposed over the poly-Si layer, followed by formation of an etch mask in the areas imprinted by the stamp. The poly-Si layer then can be etched with the mask in place, such that un-etched regions of the poly-Si layer define the meta-atoms and the protective structure laterally surrounding the optically active area of the metastructure. Unlike the process described above, this technique does not require depositing metamaterial into openings formed by the imprinting step.

In some implementations, the meta-atoms as well as the surrounding protective structure are composed of nanoparticles embedded in the replication material (e.g., a polymeric material). For example, the metastructure can be formed directly in a high refractive index material composed of nanoparticles embedded in a curable (or cured) polymer. The nanoparticles may provide improved optical performance and/or mechanical robustness. In some implementations, the nanoparticles represent a majority of a weight of the mixture that includes the nanoparticles and the replication material. For example, in some implementations, the mixture is about 80% nanoparticles by weight and about 20% replication material by weight. In some implementations, the mixture is between about 60% nanoparticles by weight and about 90% nanoparticles by weight. In some implementations, nanoparticles represent less than about 50% of the weight of the mixture. The protective structure laterally surrounding the metastructure can be composed of the same material as the metastructure itself; that is the protective structure can be composed of nanoparticles embedded in a curable (or cured) polymer.

Optical devices incorporating a metastructure and protective structure as described above may be integrated into modules that house one or more optoelectronic devices (e.g., light emitting and/or light sensing devices). The metastructure can be used, for example, to modify one or more characteristics (e.g., phase, amplitude, angle, etc.) of an emitted or incoming light wave as it passes through the metastructure. The optical element may be, or include, for example, a lens, lens array, beam splitter, diffuser, polarizer, bandpass filter, or other optical element. Examples of diffractive optical elements that can be manufactured using the foregoing techniques include diffraction and other gratings, beam splitters, beam shapers, collimators, diffractive diffusers, as well as other optical elements.

Various modifications to the foregoing examples will be apparent. Further, features described above in connection with different examples may, in some cases, be included in the same implementation. Accordingly, other implementations are within the scope of the claims.

What is claimed is:

1. An apparatus comprising:
   an optical element comprising:
   a metasurface including meta-atoms; and
   a protective structure outside of an optically active area of the metasurface,
   wherein the protective structure laterally surrounds the optically active area and is composed of a same material as the meta-atoms,
   wherein the protective structure includes a plurality of substructures,
   wherein the substructures are separated from one another and, collectively, laterally surround the optically active area, and
   wherein the substructures are semi-annular shaped.

2. The apparatus of claim 1 wherein the substructures include a plurality of groups of substructures, wherein adjacent substructures within each particular one of the groups are separated from another by a first distance, and wherein adjacent groups are separated from one another by a second distance that differs from the first distance.

3. The apparatus of claim 2 wherein the second distance is greater than the first distance.

4. The apparatus of claim 1, wherein the substructures have a shape that differs from a shape of the meta-atoms.

5. The apparatus of claim 1, wherein the substructures have a height that differs from a height of the meta-atoms.

6. The apparatus of claim 1 wherein the protective structure and the meta-atoms are composed of nanoparticles embedded in a curable polymer.

7. A method of manufacturing an optical element, the method comprising:
   imprinting a stamp into a polymeric material on a substrate, wherein the stamp includes first projections corresponding to an active area of the stamp for formation of meta-atoms in the polymeric material, the stamp further including a protective structure laterally surrounding the first projections, the protective structure including at least one additional projection extending in parallel to the first projections; and
   removing the stamp from the polymeric material, thereby forming openings in the polymeric material in positions corresponding to the first projections and in one or more positions corresponding to the at least one additional projection,
   wherein the protective structure of the stamp includes a plurality of second projections,
   wherein the second projections are separated from one another and, collectively, laterally surround the active area of the stamp, and
   wherein the second projections are semi-annular shaped.

8. The method of claim 7 further including:
   depositing a material in the openings in the polymeric material to form the meta-atoms of the optical element in the positions corresponding to the first projections and to form a protective structure of the optical element that laterally surrounds the meta-atoms.

9. The apparatus of claim 5, wherein the plurality of substructures have a height that is greater than a height of the meta-atoms.

10. The apparatus of claim 5, wherein the plurality of substructures have a height that is less than a height of the meta-atoms.

11. The apparatus of claim 1, wherein the plurality of substructures have a height that is substantially the same as a height of the meta-atoms.

12. The apparatus of claim 1, wherein the plurality of substructures have a pyramid shaped cross-section.

13. The apparatus of claim 12, wherein the meta-atoms have a rectangular shaped cross-section.

14. The apparatus of claim 1, wherein the plurality of substructures have a width that differs from a width of the meta-atoms.

15. The apparatus of claim 14, wherein the width of the plurality of substructures is greater than the width of the meta-atoms.

16. The method of claim 7, wherein the second projections have a shape that differs from a shape of the meta-atoms.

17. The method of claim 16, wherein the second projections have a pyramid shaped cross-section and the meta-atoms have a rectangular shaped cross-section.

18. The method of claim 7, wherein the second projections have a height greater than a height of the meta-atoms.

19. The method of claim 7, wherein the second projections have a height that is less than a height of the meta-atoms.

20. The method of claim 7, wherein the second projections have a height that is substantially the same as a height of the meta-atoms.

21. The method of claim 7, wherein the second projections have a width that differs from a width of the meta-atoms.

22. The method of claim 21, wherein the width of the second projections is greater than the width of the meta-atoms.

23. An apparatus comprising:

an optical element comprising:

a metasurface including meta-atoms; and a protective structure outside of an optically active area of the metasurface, wherein the protective structure laterally surrounds the optically active area and is composed of a same material as the meta-atoms, wherein the protective structure includes a plurality of substructures, wherein the substructures are separated from one another and, collectively, laterally surround the optically active area, wherein the substructures include a first group of substructures having a first diameter and a second group of substructures having a second diameter greater than the first diameter, and wherein the substructures are arranged in a circular pattern that alternates between a respective one of the substructures in the first group and a respective one of the substructures in the second group.

24. The apparatus of claim 23, wherein the protective structure and the meta-atoms are composed of nanoparticles embedded in a curable polymer.

25. The apparatus of claim 23, wherein the substructures have a shape that differs from a shape of the meta-atoms.

26. The apparatus of claim 23, wherein the substructures have a height that differs from a height of the meta-atoms.

27. A method of manufacturing an optical element, the method comprising:

imprinting a stamp into a polymeric material on a substrate, wherein the stamp includes first projections corresponding to an active area of the stamp for formation of meta-atoms in the polymeric material, the stamp further including a protective structure laterally surrounding the first projections, the protective structure including at least one additional projection extending in parallel to the first projections; and removing the stamp from the polymeric material, thereby forming openings in the polymeric material in positions corresponding to the first projections and in one or more positions corresponding to the at least one additional projection, wherein the protective structure of the stamp includes a plurality of second projections, wherein the second projections are separated from one another and, collectively, laterally surround the active area of the stamp, and wherein the second projections include a first group of second projections having a first diameter and a second group of second projections having a second diameter greater than the first diameter, and wherein the second projections are arranged in a circular pattern that alternates between a respective one of the second projections in the first group and a respective one of the second projections in the second group.

28. The method of claim 27, wherein the second projections have a shape that differs from a shape of the meta-atoms.

29. The method of claim 27, wherein the second projections have a height that differs from a height of the meta-atoms.

* * * * *